US012670471B2

(12) United States Patent
Wesley et al.

(10) Patent No.: US 12,670,471 B2
(45) Date of Patent: Jun. 30, 2026

(54) MACHINE LEARNING MODEL FOR PREDICTING FUTURE AVAILABILITY OF ITEMS TO EVALUATE POTENTIAL REPLACEMENT ITEMS DURING ORDER FULFILLMENT

(71) Applicant: Maplebear Inc., San Francisco, CA (US)

(72) Inventors: Charles Wesley, San Diego, CA (US); Brent Scheibelhut, Toronto (CA)

(73) Assignee: Maplebear Inc., San Francisco, CA (US)

( * ) Notice: Subject to any disclaimer, the term of this patent is extended or adjusted under 35 U.S.C. 154(b) by 202 days.

(21) Appl. No.: 18/444,675

(22) Filed: Feb. 17, 2024

(65) Prior Publication Data

US 2025/0265630 A1     Aug. 21, 2025

(51) Int. Cl.
*G06Q 30/0601* (2023.01)
*G06Q 10/087* (2023.01)

(52) U.S. Cl.
CPC . *G06Q 10/08741* (2025.08); *G06Q 30/06313* (2025.08)

(58) Field of Classification Search
CPC .................. G06Q 10/08741; G06Q 30/06313
See application file for complete search history.

(56) References Cited

U.S. PATENT DOCUMENTS

| | | | | |
|---|---|---|---|---|
| 10,592,962 | B1 * | 3/2020 | Lauka | G06Q 30/0633 |
| 11,354,719 | B2 * | 6/2022 | Motwani | G06Q 30/06313 |

| | | | | |
|---|---|---|---|---|
| 2016/0328781 | A1 * | 11/2016 | Patel-Zellinger | |
| | | | | G06Q 30/0635 |
| 2017/0193582 | A1 * | 7/2017 | Guo | G06Q 30/0633 |
| 2022/0114640 | A1 * | 4/2022 | Pawar | G06Q 30/0631 |
| 2023/0111745 | A1 * | 4/2023 | Kruck | G06Q 30/0631 |
| | | | | 705/26.7 |
| 2023/0169567 | A1 * | 6/2023 | Chiang | G06Q 30/0631 |
| 2024/0095804 | A1 * | 3/2024 | Honnavalli | G06Q 30/06313 |
| 2025/0045813 | A1 * | 2/2025 | Bowen | G06Q 30/0635 |
| 2025/0124402 | A1 * | 4/2025 | Agarwal | G06Q 30/0631 |
| 2025/0131320 | A1 * | 4/2025 | Chandra | G06N 3/084 |
| 2025/0200628 | A1 * | 6/2025 | Bailey | G06Q 30/0629 |

OTHER PUBLICATIONS

Jonathanvanian. (2020). How Instacart fixed its A.I. and keeps up with the coronavirus pandemic. Fortune.Com, N.PAG. (Year: 2020).*

* cited by examiner

*Primary Examiner* — Ashford S Hayles
(74) *Attorney, Agent, or Firm* — Fenwick & West LLP

(57) ABSTRACT

An online concierge system receives orders and allocates orders to pickers who obtain items in an order from a retailer and deliver the items to a customer from whom the order was received. When an item included in an order is unavailable, the online concierge system suggests one or more replacement items for the item. To select a replacement item for an unavailable item, the online concierge system generates replacement scores for each of a set of candidate replacement items. A replacement score for a candidate replacement item is generated from a probability of the customer performing a positive action when the unavailable item is replaced by the candidate replacement item and a predicted probability of a picker finding the candidate replacement item at the retailer. Based on replacement scores for various candidate replacement items for an unavailable item, the online concierge system selects one or more candidate replacement items.

20 Claims, 4 Drawing Sheets

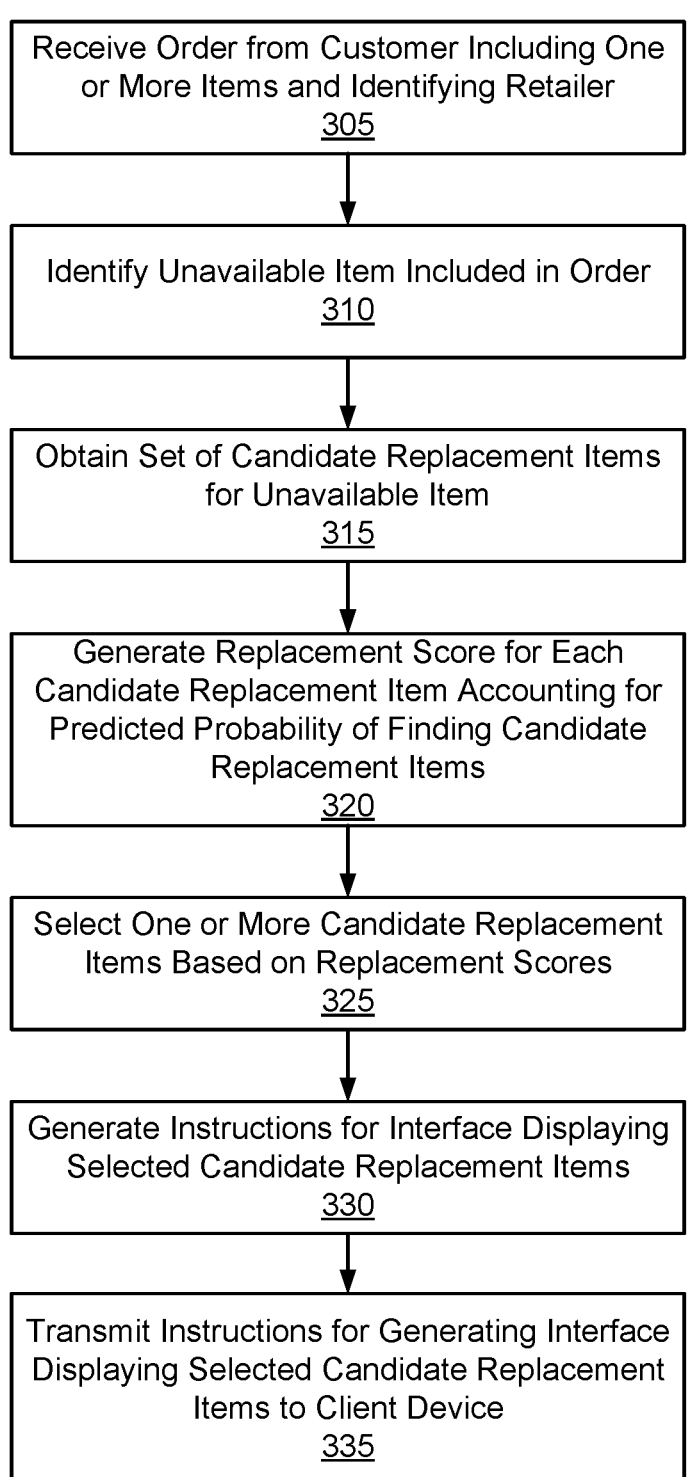

Receive Order from Customer Including One
or More Items and Identifying Retailer
305

Identify Unavailable Item Included in Order
310

Obtain Set of Candidate Replacement Items
for Unavailable Item
315

Generate Replacement Score for Each
Candidate Replacement Item Accounting for
Predicted Probability of Finding Candidate
Replacement Items
320

Select One or More Candidate Replacement
Items Based on Replacement Scores
325

Generate Instructions for Interface Displaying
Selected Candidate Replacement Items
330

Transmit Instructions for Generating Interface
Displaying Selected Candidate Replacement
Items to Client Device
335

FIG. 3

MACHINE LEARNING MODEL FOR PREDICTING FUTURE AVAILABILITY OF ITEMS TO EVALUATE POTENTIAL REPLACEMENT ITEMS DURING ORDER FULFILLMENT

BACKGROUND

Online concierge systems receive orders from customers for items offered by a retailer and allocate an order to a picker for fulfillment. A picker to whom the order was allocated obtains items in the order from a retailer identified by the order. Subsequently, to fulfill the order, the picker delivers the obtained items to a customer from whom the online concierge system received the order.

Because pickers obtain items for orders from retailers, availability of items at a retailer affects the ability of a picker to fulfill an order. For example, when one or more items included in an order are out of stock or otherwise unavailable at a retailer, a picker cannot include those items in the order. To maintain customer satisfaction when items in an order are unavailable, many online concierge systems provide a refund or another type of credit to a customer for items included in an order that are unavailable at a retailer. While providing a credit to a customer allows the customer to receive other items in the order that were available at the retailer, refunding or crediting the customer for the unavailable item decreases revenue to an online concierge system from fulfilling the order.

Some online concierge systems allow a customer to identify a replacement item for an item that is unavailable at a retailer. When the item is unavailable, a picker fulfilling an order including the unavailable item replaces the unavailable item with the replacement item and fulfills the order. To simplify identification of replacement items, an online concierge system may apply a trained model to different candidate replacement items for an item, generating scores used to select one or more candidate replacement items. For example, a score for a candidate replacement item is based on a probability of a customer approving replacement of an item with the candidate replacement item.

Although conventional models for scoring candidate replacement items account for customer preferences and actions, they do not account for effects on overall item availability at a retailer from inclusion of replacement items in orders when an item is unavailable. While selecting candidate replacement items based on preferences or actions of customers of the online concierge system optimizes fulfillment of orders for the customers, such selection of candidate replacement items may decrease a retailer's inventory of different replacement items when an item is unavailable. This depletes the retailer's inventory of other items when replacing an unavailable item, which decreases availability of the replacement items for other customers or for persons visiting the retailer. Such a reduction in inventory of various replacement items may decrease subsequent orders for fulfillment at the retailer received by an online concierge system and purchases of items from the retailer over time. However, accounting for future availability of an item when evaluating potential replacement items requires an estimation of future availability, and there is no technical ability to make such an estimation.

SUMMARY

In accordance with one or more aspects of the disclosure, an online concierge system receives an order from a customer. The order includes one or more items and identifies a retailer from which the one or more items are to be obtained. In various embodiments, the order includes a location and a time for delivery of the one or more items included in the order, although different or additional information may be included in the order in various embodiments. The online concierge system allocates the order to a picker, who obtains the items included in the order from the retailer identified by the order and delivers the obtained items to the location identified by the order.

As the picker obtains items included in the order from the retailer identified by the order, availability of different items in the order at the retailer affects fulfillment of the order by the picker. To mitigate effects of an item that is not available at the retailer, referred to herein as an "unavailable item," the online concierge system identifies an unavailable item in the order. In various embodiments, the unavailable item in the order is identified by the retailer as out of stock. Alternatively, the online concierge system determines the unavailable item has less than a threshold predicted probability of being found at the retailer identified by the order based on application of an availability model to a combination of an identifier of the retailer identified by the order and an identifier of the unavailable item. The availability model generates a probability of the picker finding an item at the retailer at a time included in the order and is trained based on historical rates at which pickers found the item at the retailer at different times the online concierge system determines from stored data. As another example, a picker transmits an indication to the online concierge system that the picker is unable to find the unavailable item at the retailer identified by the order.

To prevent revenue loss from refunding the customer for the picker being unable to obtain the unavailable item from the retailer, the online concierge system allows the picker to replace the unavailable item with a replacement item. To simplify selection of a replacement item, the online concierge system obtains a set of candidate replacement items for the unavailable item. In some embodiments, each candidate replacement item has a common item category as the unavailable item. Alternatively, each candidate replacement item was included in one or more prior orders as a replacement for the unavailable item. In other embodiments, each candidate replacement item has one of more common characteristics with the unavailable item or satisfies one or more other criteria stored by the online concierge system.

The online concierge system applies a trained replacement model to each combination of the unavailable item and a candidate replacement item. The replacement model includes a replacement model and the availability model and receives a combination of an identifier of the unavailable item, an identifier of a candidate replacement item, and an identifier of the retailer included in the order. The replacement model generates a probability of the customer performing a positive action when the unavailable item is replaced by the candidate replacement item. In some embodiments, the positive action comprises the customer approving replacement of the unavailable item with the candidate replacement item. As another example, the positive action comprises the online concierge system receiving positive feedback from the customer when the unavailable item is replaced with the candidate replacement item. The replacement model may generate a probability of the customer performing one or more positive actions when the unavailable item is replaced by the candidate replacement items in some embodiments. The online concierge system trains the replacement model through a backpropagation process where the replacement model is applied to multiple replacement training examples generated from prior orders, with each replacement training example including a combination of an item and a replacement item, where a label applied to a replacement training example indicates whether a customer performed the positive action when the item was replaced by the replacement item.

While the replacement model generates a predicted probability of the customer from whom the order was received performing a positive action when a candidate replacement item replaces unavailable item, when a candidate replacement item replaces the unavailable item in the order, the overall inventory of items available by the retailer identified by the order decreases. This makes the items available at the retailer less diverse by decreasing an availability of the candidate replacement item included in the order as well as the unavailable item, which provides subsequent pickers or customers visiting the retailer in person with fewer options for purchase. For example, candidate replacement items with higher predicted probabilities of customers performing positive actions when used to replace an unavailable item are likely to more quickly also become unavailable, reducing available options for items available to other pickers or to customers obtaining items from the retailer. This increased reduction in item availability decreases an overall number of items capable of being obtained from the retailer, decreasing both revenue to the retailer and a number of orders the online concierge system subsequently receives for fulfillment from the retailer.

To increase diversity of items available at the retailer while enabling replacement of the unavailable item with a replacement item, the replacement model also includes the availability model. The availability model receives a combination of an item and a retailer and generates a predicted probability of a picker finding the item at the retailer. In various embodiments, the availability model receives a combination of the item, the retailer, and a time as input and generates a predicted probability of the item being found by a picker at the retailer at the time. The replacement model provides an identifier of a candidate replacement item and an identifier of the retailer included in the order as input to the availability model to determine a predicted probability of the candidate replacement item being found at the retailer. In various embodiments, the online concierge system trains the availability model through a backpropagation process there the availability model is applied to multiple availability training examples that each include an identifier of an item and an identifier of a retailer, with a label applied to a training example specifying a rate at which shoppers found the item at the retailer.

In some embodiments, the availability model generates a predicted probability of a candidate replacement item being found by the picker at the retailer identified by the order at a time identified by the order. Alternatively, the availability model determines a set of predicted probabilities of the candidate replacement item being available at the retailer identified by the order at different times of set of times. The set of times is within a time interval of the time identified by order. In some embodiments, the time interval is a specific length of time from the time identified by the order; for example, the time interval is 24 hours from the time identified by the order. Alternatively, the time interval is a length of time between consecutive times when the candidate replacement item, or items in a common item category as the candidate replacement item, has a maximum rate of being found in the retailer, allowing the online concierge system to use a time interval particular to a length of time for the candidate replacement item, or for items in the common item category as the candidate replacement item, to be restocked at the retailer. When determining a set of predicted probabilities corresponding to different times, the replacement model selects a predicted probability of the set having a minimum value in various embodiments. Selecting the minimum predicted probability allows the replacement model to account when the candidate replacement item is least likely to be found at the retailer identified by the order during the time interval from the time included in the order.

For a combination of the unavailable item and a candidate replacement item, the replacement model generates a replacement score for the candidate replacement item based on the predicted probability of the customer from whom the order was received performing a positive action when the unavailable item is replaced by the candidate replacement item and based on the predicted probability of the candidate replacement item being found at the retailer. For example, the replacement score for a candidate replacement item is a product of the predicted probability of the customer from whom the order was received performing a positive action when the unavailable item is replaced by the candidate replacement item and the predicted probability of the candidate replacement item being found at the retailer. However, in other embodiments, the replacement model generates the replacement score for a candidate replacement item as another combination of the predicted probability of the customer from whom the order was received performing a positive action when the unavailable item is replaced by the candidate replacement item and the predicted probability of the candidate replacement item being found at the retailer.

In various embodiments, the online concierge system applies the replacement model to each combination of the unavailable item and a candidate replacement item of a set of candidate replacement items. Based on the replacement scores, the online concierge system selects one or more of the candidate replacement items. For example, the online concierge system ranks candidate replacement items of the set based on their corresponding replacement scores and selects candidate replacement items having at least a threshold position in the ranking.

The online concierge system displays the selected one or more candidate replacement items to a user of the online concierge system associated with the order. For example, the online concierge system transmits instructions for generating an interface displaying the selected candidate replacement items to a customer client device of the customer from whom the order 400 was received. Alternatively or additionally, the online concierge system transmits instructions for generating an interface displaying the selected candidate replacement items to a picker client device of a picker fulfilling the order. In some embodiments, the interface generated by the online concierge system displays the selected candidate replacement items in an order based on their corresponding replacement scores, with a candidate replacement item having a higher score having a more prominent position in the interface. Visually distinguishing the selected candidate replacement items from other items in an interface increases a likelihood of the user selecting a candidate replacement item for the unavailable item that increases a diversity of items available at the retailer for a longer period of time. This increased diversity in available items provides customers of the retailer with increased options of items for purchase, increasing a likelihood of customers placing subsequent orders for fulfillment with the retailer and increasing a number of items customers obtain from the retailer over time.

BRIEF DESCRIPTION OF THE DRAWINGS

FIG. 3 is a flowchart of a method for selecting one or more candidate replacement items for an item included in an order using a trained replacement model accounting for predicted availabilities of candidate replacement items at a retailer, in accordance with one or more embodiments.

DETAILED DESCRIPTION

Figure 1:
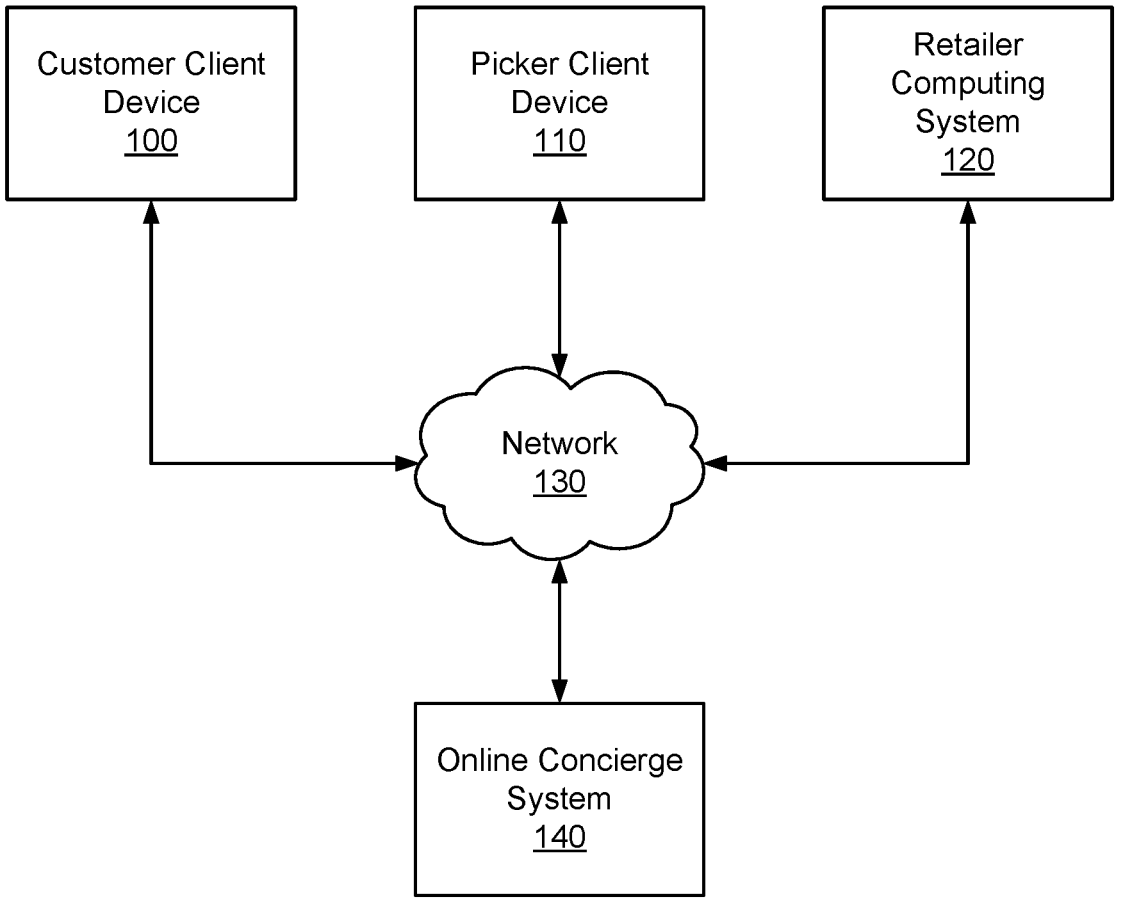
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
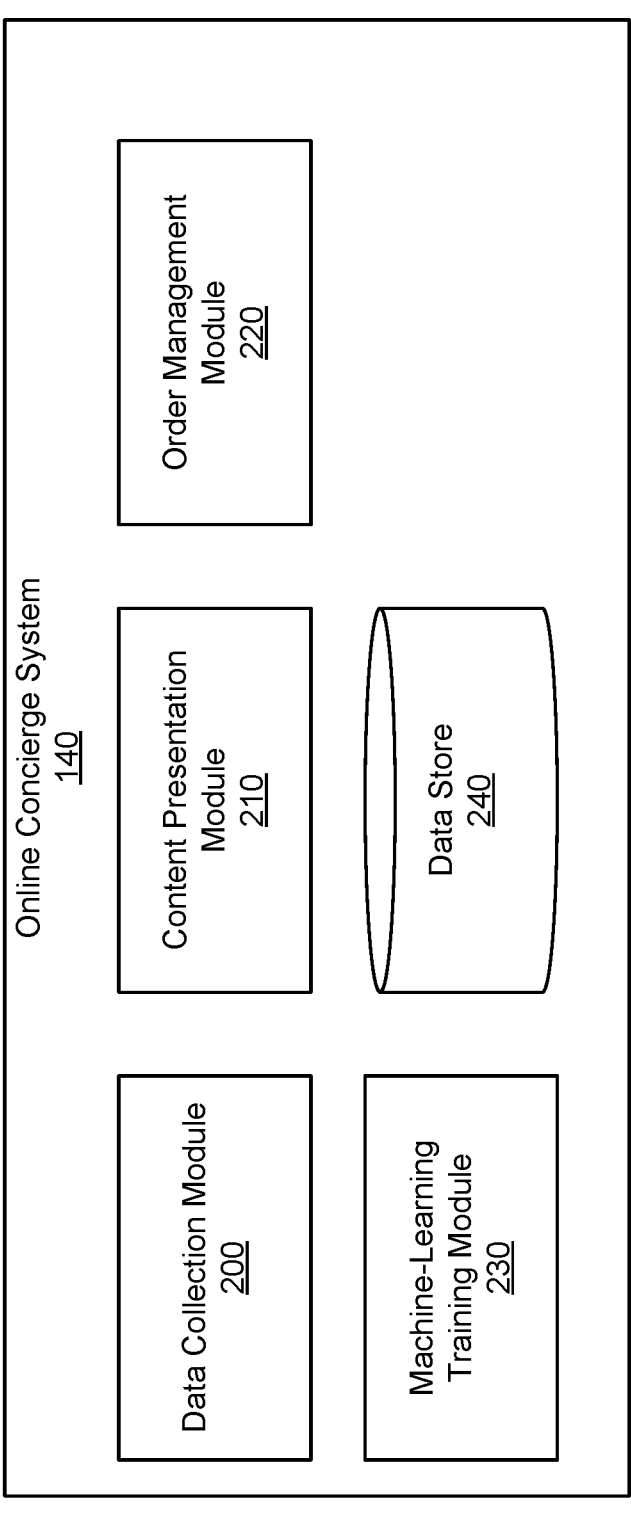
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

In various embodiments, the order management module 220 displays one or more candidate replacement items for an item included in the order that is unavailable at a retailer (i.e., an "unavailable item"). As further described below in conjunction with FIGS. 3 and 4, the displayed candidate replacement items are selected based on predicted probabilities of a customer performing a positive action when the unavailable item is replaced by candidate replacement items and predicted probabilities of candidate replacement items being available at a retailer from which the order including the unavailable item is to be fulfilled. Determining a replacement score for a candidate replacement item based on a predicted probability of a customer performing a positive action when the unavailable item is replaced by the candidate replacement item and based on a predicted probability of the candidate replacement item being available at a retailer from which the order including the unavailable item is to be fulfilled is further described below in conjunction with FIGS. 3 and 4.

The order management module 220 transmits instructions to a customer client device for a customer from whom the order including the unavailable item was received to generate an interface displaying one or more candidate replacement items selected based on their replacement scores, as further described below in conjunction with FIGS. 3 and 4 to the customer. Interacting with the interface through the customer client device allows the customer to select a candidate replacement item for replacing the unavailable item. Additionally or alternatively, the order management module 220 transmits instructions to a picker client device 110 for a picker fulfilling the order including the unavailable item to generate an interface displaying one or more candidate replacement items selected based on their replacement scores, as further described below in conjunction with FIGS. 3 and 4, to the picker. The picker may select a candidate replacement item for replacing the unavailable item based on the interface.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The machine learning training module 230 trains a replacement model that receives an identifier of an item, an identifier of a candidate replacement item, and an identifier of a retailer. The replacement model generates a replacement score for the candidate replacement item. As further described below in conjunction with FIGS. 3 and 4, the replacement score accounts for a predicted probability of a customer performing a positive action in response to replacing the item in an order with the candidate replacement item and accounts for a predicted probability of a picker finding the candidate replacement item at the retailer. In various embodiments, the replacement model includes a replacement model that generates the predicted probability of a customer performing a positive action in response to replacing the item in an order, and an availability model that generates predicted probability of a picker finding the candidate replacement item at the retailer. The replacement model generates the replacement score by combining the predicted probability of a customer performing a positive action in response to replacing the item in an order with the candidate replacement item and the predicted probability of a picker finding the candidate replacement item at the retailer, as further described below in conjunction with FIGS. 3 and 4. For example, the replacement score is a product of the predicted probability of a customer performing a positive action in response to replacing the item in an order with the candidate replacement item and the predicted probability of a picker finding the candidate replacement item at the retailer.

As further described below in conjunction with FIG. 3, the machine learning training module 230 uses an iterative training process to train the replacement model. In various embodiments, the machine learning training module 230 applies the replacement model to multiple replacement training examples that each include a combination of an identifier of an item and an identifier of a replacement item and that each have a label applied indicating whether a customer performed a positive action in response to the item being replaced with the replacement item. During the iterative training process, the machine learning training module 230 uses a loss function based on a difference between a predicted probability of a customer performing a positive action when an item is replaced by a replacement item generated by application of the replacement model to a replacement training example and the label applied to the replacement training example. Based on the score, the machine learning module updates one or more parameters comprising the replacement model. The machine learning training module 230 iteratively updates parameters of the replacement model based on scores from the loss function until one or more criteria are satisfied in various embodiments.

Similarly, the machine learning training module 230 uses an iterative training process to train the availability model. In various embodiments, the machine learning training module 230 applies the availability model to multiple availability training examples that each include a combination of an identifier of an item and an identifier of a retailer and that each have a label applied indicating a rate at which one or more pickers found the item at the retailer. During the iterative training process, the machine learning training module 230 uses a loss function based on a difference between a predicted probability of a picker finding the item at the retailer generated by application of the replacement model to an availability training example and the label applied to the availability training example. Based on the score, the machine learning module updates one or more parameters comprising the availability model. The machine learning training module 230 iteratively updates parameters of the availability model based on scores from the loss function until one or more criteria are satisfied in various embodiments.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

FIG. 3 is a flowchart of a method for selecting one or more candidate replacement items for an item included in an order using a trained replacement model that accounts for predicted availabilities of candidate replacement items at a retailer, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

An online concierge system 140 receives 305 an order from a customer that includes one or more items and identifies a retailer from which the one or more items are to be obtained. In various embodiments, the order includes additional information, such as a time for providing the items in the order to the customer or a location where obtained items in the order are to be delivered. The online concierge system 140 allocates the order to a picker, who obtains the items in the order from the retailer identified by the order. The picker fulfills the order by delivering the items included in the order to a location included in the order during a time specified by the order.

One or more items included in the order may be unavailable from the retailer identified by the order when the picker fulfills the order. For example, an item included in the order has low inventory at the retailer when the customer creates the order, and the item is subsequently sold out at the retailer when the picker arrives at the retailer to fulfill the order. As another example, inventory information the online concierge system 140 receives from a retailer is not current, so the customer includes an item in the order that is out of stock at the retailer. When the picker obtains items for the order (or prior to the picker obtaining items for the order), the online concierge system 140 identifies 310 an item in the order that is unavailable at the retailer identified by the order (an "unavailable item"). For example, the online concierge system 140 receives a notification from the picker fulfilling the order identifying an unavailable item.

In various embodiments, the online concierge system 140 applies an availability model to each item in the order and identifies 310 one or more unavailable items based on output of the availability model. As further described above in conjunction with FIG. 2, the availability model predicts a probability that the picker finds the item at the retailer (an item is "available" if the picker finds the item at the retailer). In other embodiments, the availability model predicts an estimated number of items that are available at the retailer identified by the order. The online concierge system 140 identifies 310 an unavailable item as an item having less than a threshold probability of being found by the picker at the retailer identified by the order in some embodiments. As another example, the online concierge system 140 identifies 310 an unavailable item as an item having less than a threshold estimated number of items available at the retailer identified by the order. However, in other embodiments, the online concierge system 140 identifies 310 an unavailable item in the order using one or more alternative or additional methods.

The online concierge system 140 may train the availability model to predict a probability of the picker finding an item at the retailer at a time when the order is received 305. Alternatively, the online concierge system 140 may train the availability model to predict an estimated number of the item available at the retailer at the time when the order is received 305. However, the order may specify a time for fulfilling the order that is later than the time when the order is received 305. To identify 310 an unavailable item in an order, in various embodiments, the online concierge system 140 trains the availability model to receive a combination of an identifier of an item, an identifier of a retailer, and a time, so the availability model generates a predicted probability of a picker finding the item at the retailer at the time (or generates a predicted number of the item available at the retailer at the time). The online concierge system 140 generates availability training data obtained from historical data describing rates at which pickers obtained various items from a retailer at different times to train the availability model. For example, the availability training data includes multiple availability training examples that each include a combination of an item identifier, a retailer identifier, and a time, with a label applied to an availability training example specifying a rate at which the item corresponding to the item identifier was found by pickers at the retailer corresponding to the retailer identifier at the time. In some embodiments, the time received by the availability model comprises a combination of a day of the week and a time of day, while in other embodiments the availability model receives the time in a different format.

The availability model comprises a set of weights stored on a non-transitory computer readable storage medium in various embodiments. For training, the online concierge system 140 initializes a network of a plurality of layers comprising the availability model, with each layer including one or more weights. The availability model receives as input an item identifier, a retailer identifier, and a time and outputs a predicted probability of the item corresponding to the item identifier being available at the retailer corresponding to the retailer identifier at the time.

After initializing the set of weights comprising the availability model, the online concierge system 140 trains the availability model by applying the availability model to multiple availability training examples of the availability training dataset to generate the parameters (e.g., the weights) for the availability model. As further described above, in various embodiments, an availability training example includes a combination of an item identifier, a retailer identifier, and a time. A label applied to the availability training example indicates a rate at which the item corresponding to the item identifier was found by one or more pickers at the retailer corresponding to the retailer identifier at the time. Applying the availability model to an availability training example generates a predicted probability of an item corresponding to the item identifier being found by a picker at the retailer corresponding to the retailer identifier at the time.

For each availability training example to which the availability model is applied, the online concierge system 140 generates a score comprising an error term based on the predicted probability of an item corresponding to the item identifier included in the availability training example being found by a picker at the retailer corresponding to the retailer identifier included in the availability training example at the time included in the availability training example and the label applied to the availability training example. The error term is larger when a difference between the predicted probability of an item in an availability training example being found at the retailer in the availability training example at the time included in the availability training example and the label applied to the availability training example is larger and is smaller when the difference between the predicted probability of an item in an availability training example being found at the retailer in the availability training example at the time included in the availability training example and the label applied to the availability training example is smaller. In various embodiments, the online concierge system 140 generates the error term using a loss function based on a difference between the predicted probability of in an availability training example being found at the retailer in the availability training example at the time included in the availability training example and the label applied to availability the training example. Example loss functions include a mean square error function, a mean absolute error, a hinge loss function, and a cross-entropy loss function.

The online concierge system 140 backpropagates the error term to update the set of parameters comprising the availability model and stops backpropagation in response to the error term, or in response to the loss function, satisfying one or more criteria. For example, the online concierge system 140 backpropagates the error term through the availability model to update parameters of the availability model until the error term has less than a threshold value. For example, the online system 140 may apply gradient descent to update the set of parameters. The online concierge system 140 stores the set of parameters comprising the trained availability model on a non-transitory computer readable storage medium after stopping the backpropagation.

To provide a picker with greater flexibility in fulfilling the order, the online concierge system 140 allows the picker fulfilling the order to include a replacement item in the order in place of the unavailable item. Allowing inclusion of a replacement item in the order in place of the unavailable item prevents the online concierge system 140 from losing revenue from the order by refunding a customer for the unavailable item. To simplify selection of a replacement item by the customer or by the picker fulfilling the order, the online concierge system 140 obtains 315 a set of candidate replacement items for the unavailable item. In some embodiments, the online concierge system obtains 315 items having a common item category as the unavailable item as the set of candidate replacement items. In other embodiments, the online concierge system 140 obtains 315 items that the customer or other customers have previously included in orders in place of the unavailable item as the set of candidate replacement items. In other embodiments, the online concierge system 140 obtains 315 items satisfying one or more additional or alternative criteria as the set of candidate replacement items for the unavailable item.

The online concierge system 140 generates 320 a replacement score for each of the candidate replacement items. In various embodiments, the online concierge system 140 generates 320 the replacement score for a candidate replacement item based on a predicted probability of the customer performing a positive action when the unavailable item is replaced by the candidate replacement item generated from applying a trained replacement model to a combination of an identifier of the candidate replacement item and an identifier of the unavailable item and based on a predicted probability of the candidate item being found by the picker at the retailer identified by the order during a time corresponding to the order generated from applying the availability model to the identifier of the candidate replacement item, an identifier of the retailer in the order, and a time corresponding to the order. By incorporating the predicted probability of the candidate replacement item being found by the picker at the retailer identified by the order, the online concierge system

140 accounts for availability of various candidate replacement items in the retailer where the order is to be fulfilled when evaluating various candidate replacement items for replacing the unavailable item.

To generate 320 a replacement score for a candidate replacement item, the online concierge system 140 applies a replacement model to each of at least a set of the candidate replacement items. The replacement model includes the trained availability model further described above and a trained replacement model. The online concierge system 140 trains the replacement model to output a predicted probability of the customer performing a positive action when the unavailable item is replaced by a candidate replacement item. For example, the replacement model generates a probability of the customer approving replacement of the unavailable item with a candidate replacement item. As another example, a positive action by the customer comprises the customer providing positive feedback to the online concierge system 140 in response to replacing the unavailable item with the candidate replacement item, or performing another action indicating satisfaction with replacing the unavailable item with the candidate replacement item to the online concierge system 140.

The replacement model comprises a set of weights stored on a non-transitory computer readable storage medium in various embodiments. For training, the online concierge system 140 initializes a network of a plurality of layers comprising the replacement model, with each layer including one or more weights. The replacement model receives as input an item identifier of an unavailable item and an item identifier of a candidate replacement item and outputs a predicted probability of the customer performing a positive action in response to replacing the unavailable item with the candidate replacement item. For example, the replacement model generates a predicted probability of the customer approving replacing the unavailable item with the candidate replacement item.

After initializing the set of weights comprising the replacement model, the online concierge system 140 trains the replacement model by applying the replacement model to multiple replacement training examples of a replacement training dataset to generate the parameters (e.g., the weights) for the availability model. Each replacement training example includes a combination of an item identifier of an item and an item identifier of a replacement item. In various embodiments, the item included in a replacement training example is an item that was unavailable when a picker fulfilled a prior order, and the replacement item included in the replacement training example was included in the prior order in place of the item. A label applied to the replacement training example indicates whether a customer performed a positive action in response to the item being replaced with the replacement item. For example, a label has a first value when a customer approved replacement of the item with the replacement item in the prior order and has a different second value when the customer did not approve replacement of the item with the replacement item in the prior order. Examples of positive actions include approving replacement of the item with the replacement item, providing the online concierge system 140 with positive feedback for replacing the item with the replacement item, or other actions indicating satisfaction of replacing the item with the replacement item.

Applying the replacement model to a replacement training example generates a predicted probability of the customer performing a positive action in response to replacing the item in the replacement training example with the replacement item in the replacement training example. The online concierge system 140 generates a score for each replacement training example to which the replacement model is applied based on comparing a predicted probability of the customer performing a positive action in response to replacing the item in the replacement training example with the replacement item included in a replacement training example and the label applied to the replacement training example, In various embodiments, the score comprises an error term based on a difference between the predicted probability of the customer performing a positive action in response to replacing the item in the replacement training example with the replacement item included in the replacement training example and the label applied to the replacement training example. The error term is larger when a difference between the predicted probability of the customer performing a positive action in response to replacing the item in the replacement training example with the replacement item included in the replacement training example and the label applied to the replacement training example is larger and is smaller when the difference between the predicted probability of the customer performing a positive action in response to replacing the item in the replacement training example with the replacement item included in the replacement training example and the label applied to the replacement training example is smaller. In various embodiments, the online concierge system 140 generates the error term using a loss function based on a difference between the predicted probability of the customer performing a positive action in response to replacing the item in the replacement training example with the replacement item included in the replacement training example and the label applied to the replacement training example. Example loss functions include a mean square error function, a mean absolute error, a hinge loss function, and a cross-entropy loss function.

The online concierge system 140 backpropagates the error term to update the set of parameters comprising the replacement model and stops backpropagation in response to the error term, or in response to the loss function, satisfying one or more criteria. For example, the online concierge system 140 backpropagates the error term through the replacement model to update parameters of the replacement model until the error term has less than a threshold value. For example, the online system 140 may apply gradient descent to update the set of parameters. The online concierge system 140 stores the set of parameters comprising the trained replacement model on a non-transitory computer readable storage medium after stopping the backpropagation.

The replacement model generates 320 the replacement score for a candidate replacement item based on an output of the trained availability model and an output of the trained replacement model. In some embodiments, the replacement score for a candidate replacement item is generated 320 as a product of a predicted probability of the customer performing a positive action in response to replacing the unavailable item in the order with the candidate replacement item from the replacement model and a predicted probability of the candidate replacement item being found by a picker at the retailer identified by the order from the availability model. Alternatively, the replacement model applies a weight to the predicted probability of the customer performing the positive action in response to replacing the unavailable item in the order with the candidate replacement item from the replacement model and applies an availability weight to the predicted probability of the candidate replacement item being found by the picker at the retailer identified by the order from the availability model. The replacement model sums the weighted predicted probability of the customer performing a positive action in response to replacing the unavailable item in the order with the candidate replacement item from the replacement model and the weighted predicted probability of the candidate replacement item being found by the picker at the retailer identified by the order from the availability model to generate 320 the replacement score for the candidate replacement item in some embodiments. Alternatively, the replacement model differently combines the weighted predicted probability of the customer performing a positive action in response to replacing the unavailable item in the order with the candidate replacement item from the replacement model and the weighted predicted probability of the candidate replacement item being found by the picker at the retailer identified by the order from the availability model to generate 320 the replacement score for the candidate replacement item. Applying different weights to the predicted probability of the customer performing a positive action in response to replacing the unavailable item in the order with the candidate replacement item from the replacement model and to the weighted predicted probability of the candidate replacement item being found by the picker at the retailer identified by the order from the availability model allows the replacement model to adjust how the different values influence the replacement score for a candidate replacement item.

In some embodiments, the replacement model generates 320 the replacement score based on a predicted probability of the candidate replacement item being found by the picker at the retailer identified by the order at the time included in the order. Alternatively, the replacement model applies the availability model to different combinations of an identifier of the candidate replacement item, an identifier of the retailer, and different times from a set of times, generating multiple predicted probabilities of the candidate replacement item being found at the retailer at different times. For example, the replacement model applies the available model to the identifier of the candidate replacement item, the identifier of the retailer, and to each time in a set of times, generating a set of predicted probabilities of the candidate replacement item being found by the picker at the retailer identified by the order at different times in the set of times. In some embodiments, the set of times includes different times during a predefined time interval. For example, the set of times includes different times within a 24-hour period after the time included in the order.

Alternatively, the online concierge system 140 determines the time interval for the set of times based on historical rates at which items in a common item category as the candidate replacement item, or the unavailable item, were found by pickers. For example, the online concierge system 140 retrieves historical data from the data store 240 including rates at which various items included in the item category including the candidate replacement item were found at the retailer identified by the order. Based on the historical rates at which items included in the item category were found at the retailer at different times, the online concierge system 140 determines an interval between consecutive times when a rate at which items in the item category including the candidate replacement item were found by pickers. In some embodiments, the interval is a length of time between consecutive times when the candidate replacement item had a maximum rate of being found at the retailer by pickers. For example, the determined time interval is a length of time between consecutive times when the candidate replacement item was found at the maximum rate, so the determined time interval specifies a length of time for the candidate replacement item to be restocked at the retailer. The set of times input to the availability model includes different times within the determined interval, generating a set of predicted likelihoods of the candidate replacement item being found in the retailer at different times during the length of time for the candidate replacement item to be restocked at the retailer. The online concierge system 140 may determine individual intervals for different candidate replacement items to account for different lengths of time for the retailer to restock different items in some embodiments. Alternatively, the online concierge system 140 may determine an item category specific interval based on an average rate at which items included in the item category were found at the retailer, with the item category specific interval identifying a length of time between consecutive times when the average rate at which items including the item category had at least a threshold value.

Based on the generated set of predicted probabilities of the candidate replacement item being found by the picker at the retailer identified by the order at different times of the set of times, the replacement model selects a predicted probability of the candidate replacement item being found by the picker at the retailer identified by the order from the set. In some embodiments, the replacement model selects a predicted probability of the candidate replacement item being found by the picker at the retailer identified by the order having a minimum value from the set of predicted probabilities. Based on the selected predicted probability of the candidate replacement item being found by the picker at the retailer identified by the order and the predicted probability of the customer performing a positive action in response to replacing the unavailable item in the order with the candidate replacement item, the replacement model generates 320 the replacement score for the candidate replacement item, as further described above. Selecting a particular predicted probability of the candidate replacement item being found by the picker at the retailer identified by the order from the set of predicted probabilities allows the replacement model to account for a time when the candidate replacement item is least likely to be found at the retailer identified by the order or for a time when the predicted probability of the picker finding the candidate replacement item at the retailer identified by the order satisfies one or more criterion. Selecting a minimum predicted probability of the candidate replacement item being found by the picker at the retailer identified by the order causes the replacement score accounts for a time in the set of times when the candidate replacement item is least likely to be found at the retailer. However, in other embodiments, the replacement model uses alternative criteria to select a predicted probability of the candidate replacement item being found by the picker at the retailer identified by the order from the set of predicted probabilities.

The online concierge system 140 applies the replacement model to each candidate item of a set, generating 320 a replacement score for each candidate item of the set of candidate items. Based on the replacement scores, the online concierge system 140 selects 325 one or more candidate replacement items. For example, the online concierge system 140 generates a ranking of the candidate replacement items based on their corresponding replacement scores, with candidate replacement items having higher replacement scores having higher positions in the ranking. The online concierge system 140 selects 325 candidate replacement items having at least a threshold position in the ranking in some embodiments. Alternatively, the online concierge system 140 selects 325 candidate replacement items having corresponding replacement scores equaling or exceeding a threshold score. In other embodiments, the online concierge system 140 selects 325 candidate replacement items with replacement score satisfying different or additional criteria.

The online concierge system 140 generates 330 instructions for an interface displaying the selected candidate replacement items to a user associated with the order. In some embodiments, the interface is displayed to the customer from whom the order was received 305, while in other embodiments, the interface is displayed to the picker fulfilling the order. Alternatively, an interface displaying the selected candidate replacement items is displayed to both the customer from whom the order was received 305 and to the picker fulfilling the order. In some embodiments, the interface displays the selected candidate replacement items more prominently than other candidate replacement items. Alternatively, the interface initially limits initial display of candidate replacement items to the selected candidate replacement items and displays other candidate replacement items in response to receiving one or more inputs. In other embodiments, the interface displays the set of candidate items in an order that is based on a ranking of the candidate replacement items based on their corresponding replacement scores, with candidate replacement items with higher replacement scores having higher positions in the order.

The online concierge system 140 transmits 335 the instructions for generating the interface to a client device of a user associated with the received order. For example, the online concierge system 140 transmits 335 the instructions for generating the interface to a customer client device 100 of the customer from whom the order was received 305. The customer may identify a particular candidate replacement item for replacing the unavailable item in the order through interaction with the interface via the customer client device 100.

Alternatively or additionally, the online concierge system 140 transmits 335 the instructions for generating the interface displaying one or more of the selected candidate replacement items to a picker client device 110 of a picker fulfilling the order. In some embodiments, the interface displays the selected candidate replacement items to the picker in an order based on their corresponding replacement scores. Determining presentation of candidate replacement items based on their corresponding replacement scores allows the interface to more prominently display selected candidate replacement items to the picker, increasing a likelihood of the picker replacing the unavailable item in the order with a selected candidate replacement item. As the replacement scores for candidate replacement items account for predicted probabilities of pickers finding a candidate replacement item in the retailer identified by the order, selecting 325 candidate replacement items based on the replacement scores allows the online concierge system 140 to increase a likelihood of the picker selecting candidate replacement items with higher predicted probabilities of being found in the retailer identified by the order. This influences selection of replacement items for unavailable items so the retailer maintains an inventory of a larger number of different candidate replacement items for an item for a longer period of time.

While FIG. 3 describes using predicted probabilities of a candidate replacement item being found in a retailer to select particular candidate replacement items for display when an item in an order is unavailable, the online concierge system 140 may similarly leverage predicted probabilities of different items being found at a retailer when displaying other types of information, such as suggestions, to users. For example, an order includes a generic item description, for which a picker may select an item from a set of items satisfying the generic item description. The online concierge system 140 applies the availability model, as further described above, to each combination of an item of the set of items and a retailer from which the order including the generic item description is fulfilled. This determines a predicted probability of the picker finding each item of the set at the retailer. The online concierge system 140 may transmit a message to a picker client device 110 of a picker fulfilling the order identifying an item of the set with at least a threshold predicted probability of being found at the retailer, with a maximum probability of being found at the retailer, or with a predicted probability of being found at the retailer satisfying one or more other criteria. Alternatively, when the picker identifies a specific item from the set to the online concierge system 140, in response to an alternative item of the set having a higher predicted probability of being found at the retailer than the specific item, the online concierge system 140 transmits a message to a picker client device 110 of the picker identifying the alternative item and including a suggestion to select the alternative item for the order. In various embodiments, the online concierge system 140 stores preferences for the customer and does not transmit the message to the picker client device 110 if the specific item obtained by the picker is identified as a preference of the customer. For example, an order includes a generic item description of "grapes," with a retailer offering different brands of grapes; when a picker fulfills the order, the online concierge system 140 transmits a message to a picker client device 110 identifying a brand of grapes with a maximum predicted probability of being available at the retailer.

As another example, when receiving a search query for a customer for items available at a retailer, the online concierge system 140 retrieves items with attributes that at least partially match the search query. In various embodiments, the online concierge system 140 determines measures of relevance between each retrieved item and the search query. For example, a measure of relevance of an item and the search query is a measure of similarity between an embedding for the item and an embedding for the search query. In various embodiments, the online concierge system 140 generates a predicted probability of each retrieved item being found at the retailer through application of the availability model further described above. The online concierge system 140 modifies the measure of relevance of a retrieved item to the search query by a corresponding predicted probability of the retrieved item being found at the retailer. For example, the online concierge system 140 multiplies the measure of relevance of a retrieved item to the search query by a corresponding predicted probability of the retrieved item being found at the retailer. The online concierge system 140 ranks the retrieved items based on the modified measures of relevance and displays the retrieved items in an order based on the ranking. This allows the retrieved items to be ordered so items with higher predicted probabilities of being found at the retailer are more visible to the customer, increasing likelihood of the customer selecting a retrieved item with a relatively higher probability of being found at the retailer. Accounting for the predicted probabilities of different items being found at the retailer allows the online concierge system 140 to display search results that increase a variety of items available at the retailer. Other types of suggestions including items may be similarly ordered or generated to account for predicted probabilities of the items being found at a retailer by the online concierge system 140.

Figure 4:
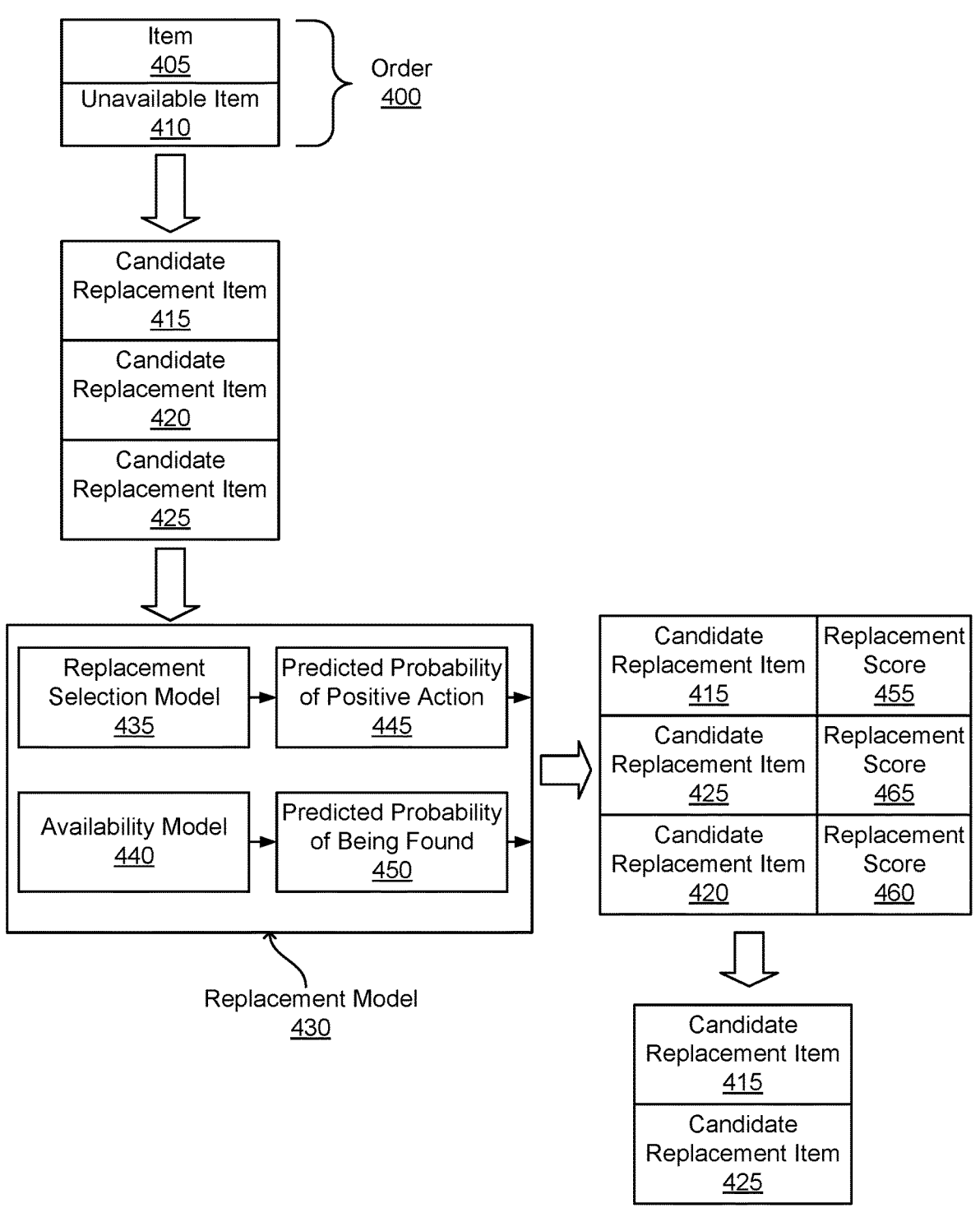
FIG. 4 is a process flow diagram of a method for selecting one or more candidate replacement items for an item included in an order using a trained replacement model accounting for predicted availabilities of candidate replacement items at a retailer, in accordance with one or more embodiments.

FIG. 4 is a process flow diagram of a method for selecting one or more candidate replacement items for an unavailable item in an order accounting for predicted availability of candidate replacement items at a retailer identified by the order. As shown in FIG. 4, an online concierge system 140 receives an order 400 from a customer. The order 400 includes one or more items and identifies a retailer from which the one or more items are to be obtained. In various embodiments, the order 400 also includes a location and a time interval for delivery of the one or more items included in the order 400, although different or additional information may be included in the order 400 in various embodiments. The online concierge system 140 allocates the order 400 to a picker, who obtains the items included in the order 400 from the retailer identified by the order 400.

Availability of different items in the order 400 at the retailer identified by the order 400 affects fulfillment of the order 400 by the picker. In the example of FIG. 4, item 405 included in the order 400 is available at the identified retailer, but the order 400 also includes an unavailable item 410. In various embodiments, the unavailable item 410 is out of stock at the retailer identified by the order 400. Alternatively, the online concierge system 140 determines the unavailable item 410 has less than a threshold predicted probability of being found at the retailer identified by the order 400 based on application of an availability model 440 to a combination of an identifier of the retailer identified by the order and an identifier of the unavailable item 410. As another example, a picker transmits an indication to the online concierge system 140 that the picker is unable to find the unavailable item 410 at the retailer identified by the order 400 when the picker is fulfilling the order 400.

To prevent revenue loss from refunding the customer for the unavailable item 410, the online concierge system 140 allows the picker to include a replacement item in the order in place of the unavailable item 410. To simplify selection of a replacement item by the picker, the online concierge system 140 obtains a set of candidate replacement items for the unavailable item 410. In the example of FIG. 4, the set of candidate replacement items includes candidate replacement item 415, candidate replacement item 420, and candidate replacement item 425. However, in other embodiments, the set of candidate replacement items includes any number of candidate replacement items. In some embodiments, candidate replacement item 415, candidate replacement item 420, and candidate replacement item 425 each have a common item category as the unavailable item 410. Alternatively, each of candidate replacement item 415, candidate replacement item 420, and candidate replacement item 425 were included in one or more prior orders as a replacement for the unavailable item 410. In other embodiments, each of candidate replacement item 415, candidate replacement item 420, and candidate replacement item 425 satisfy one or more other criteria making them suitable for inclusion in the order 400 in place of the unavailable item 410.

The online concierge system 140 applies a replacement model 430, further described above in conjunction with FIG. 3, to each candidate replacement item. As further described above in conjunction with FIG. 3, the replacement model 430 includes a replacement model 435 and the availability model 440. The replacement model 430 receives a combination of an identifier of the unavailable item 410, an identifier of a candidate replacement item, and an identifier of the retailer included in the order 400 as input. The replacement model 435 receives a combination of an identifier of the unavailable item 410 and an identifier of a candidate replacement item and generates a predicted probability 445 of the customer from whom the order 400 was received performing a positive action in response to the unavailable item 410 being replaced by the candidate replacement item. In some embodiments, the positive action is the customer approving replacement of the unavailable item 410 with the candidate replacement item. Alternatively, the positive action comprises the online concierge system 140 receiving positive feedback from the customer when the unavailable item 410 is replaced with the candidate replacement item. In other embodiments, the predicted probability 445 generated by the replacement model 430 is based on predicted probabilities of the customer performing one or more of a set of positive actions in response to the unavailable item 410 being replaced by the candidate replacement item.

While the replacement model 430 generates a predicted probability of the customer from whom the order 400 was received performing a positive action in response to replacing the unavailable item 410 with the candidate replacement item (e.g., approving replacement of the unavailable item 410 with the candidate replacement item), including a candidate replacement item in the order 400 in place of the unavailable item 410 decreases an overall inventory of items available by the retailer identified by the order. As the unavailable item 410 and a candidate replacement item are in a common item category or have other common attributes, including a candidate replacement item in orders in place of the unavailable item 410 reduces a number of potential items in the item category, or with particular attributes, available to subsequent pickers or customers visiting the retailer in person. For example, candidate replacement items with higher predicted probabilities of customers performing positive actions when used to replace an unavailable item are likely to also become unavailable in relatively short time, reducing available options for other pickers or for customers obtaining items from the retailer. This increased reduction in items available at the retailer reduces revenue to the retailer and decreases a number of orders the online concierge system 140 is capable of fulfilling at the retailer.

To increase the diversity of items available at the retailer while replacing the unavailable item 410, the replacement model 430 also includes the availability model 440. As further described above in conjunction with FIG. 3, the availability model 440 receives a combination of an identifier of an item and an identifier of a retailer as input and generates a predicted probability 450 of a picker finding the item at the retailer. In various embodiments, the availability model 440 receives a combination of the item, the retailer, and a time as input and generates a predicted probability 450 of the item being found by a picker at the retailer at the time. As further described above in conjunction with FIG. 3, the availability model 440 is trained using historical rates at which pickers found various items at a retailer.

In some embodiments, when used in the replacement model 430, the availability model 440 generates a predicted probability 450 of a candidate replacement item being found by the picker at the retailer identified by the order 400 at a time identified by the order 400. However, in other embodiments, the availability model 440 determines a set of predicted probabilities 450 of the candidate replacement item being available at the retailer identified by the order at different times of a set of times within a time interval of the time identified by order 400. In some embodiments, the time interval is a predefined length of time from the time identified by order 400. Alternatively, the time interval is a length of time between consecutive times when a rate at which a candidate unavailable item is found in the retailer has a maximum value, allowing the time interval to account for a length of time for the retailer to restock the candidate unavailable item. When determining a set of predicted probabilities 450 corresponding to different times, the replacement model 430 selects a predicted probability 450 of the set having a minimum value, in various embodiments. Selecting the minimum predicted probability 450 allows the replacement model 430 to account for a minimum predicted probability 450 of a candidate replacement item being found before the candidate replacement item is restocked at the retailer.

For a combination of the unavailable item 410 and a candidate replacement item, the replacement model 430 generates a replacement score for the candidate replacement item based on the predicted probability 445 of the customer from whom the order was received performing a positive action when the unavailable item 410 is replaced by the candidate replacement item and based on the predicted probability 450 of the candidate replacement item being found at the retailer identified by the order 400. For example, the replacement score for a candidate replacement item is a product of the predicted probability 445 of the customer from whom the order was received performing a positive action when the unavailable item 410 is replaced by the candidate replacement item and the predicted probability 450 of the candidate replacement item being found at the retailer identified by the order 400. However, in other embodiments, the replacement model 430 generates the replacement score for a candidate replacement item through another combination of the predicted probability 445 of the customer from whom the order was received performing a positive action when the unavailable item 410 is replaced by the candidate replacement item and the predicted probability 450 of the candidate replacement item being found at the retailer identified by the order 400, such as further described above in conjunction with FIG. 3.

In various embodiments, the online concierge system 140 applies the replacement model 430 to each combination of the unavailable item 410 and a candidate replacement item of a set of candidate replacement items. For purposes of illustration, FIG. 4 illustrates one or more embodiments in which the online concierge system 140 applies the replacement model 430 to each pair of the unavailable item 410 and candidate replacement item 415, candidate replacement item 420, and candidate replacement item 425. Such application of the replacement model 430 generates replacement score 455 for candidate replacement item 415, replacement score 460 for candidate replacement item 420, and replacement score 465 for candidate replacement item 425 in the example of FIG. 4. Hence, each replacement score 455, 460, 465 modifies a predicted probability 445 of the customer from whom the order 400 performing a positive action in response to response to the unavailable item 410 being replaced with a corresponding candidate replacement item based on a predicted probability 450 of the corresponding candidate replacement item being available at the retailer identified by the order 400. Based on the replacement scores 455, 460, 465, the online concierge system 140 selects one or more of candidate replacement item 415, candidate replacement item 420, and candidate replacement item 425. For example, the online concierge system 140 selects two candidate replacement items from the set of candidate replacement items based on their corresponding replacement scores. In the example of FIG. 4, the online concierge system 140 ranks candidate replacement item 415, candidate replacement item 420, and candidate replacement item 425 based on their corresponding replacement scores 455, 460, 465 and selects candidate replacement items having at least a second position in the ranking. For purposes of illustration, FIG. 4 shows an example where replacement score 455 is greater than replacement score 465, while replacement score 460 is less than replacement score 455 and replacement score 465. Hence, in the example of FIG. 4, the online concierge system 140 selects candidate replacement item 415 and candidate replacement item 425 from a ranking based on the replacement scores 455, 460, 465. In other embodiments, the online concierge system 140 uses other criteria for selecting one or more candidate replacement items based on corresponding replacement scores or selects another number of candidate replacement items.

The online concierge system 140 displays the selected one or more candidate replacement items to a user of the online concierge system 140 associated with the order. For example, the online concierge system 140 transmits instructions for generating an interface displaying candidate replacement item 415 and candidate replacement item 425 to a customer client device 100 of the customer from whom the order 400 was received. Alternatively or additionally, the online concierge system 140 transmits instructions for generating an interface displaying candidate replacement item 415 and candidate replacement item 425 to a picker client device 110 of a picker fulfilling the order 400. In some embodiments, the interface generated by the online concierge system 140 displays candidate replacement item 415 and candidate replacement item 425 in an order based on their corresponding replacement scores, with a candidate replacement item having a higher replacement score having a more prominent position in the interface. Alternatively, the interface visually distinguishes the selected candidate replacement items (e.g., candidate replacement item 415 and candidate replacement item 425 in the example of FIG. 4) from other candidate replacement items using one or more alternative methods. Visually distinguishing the selected candidate replacement items to a user in an interface increases a likelihood of the user selecting a candidate replacement item for the unavailable item 410, which maintains a greater diversity of items available at the retailer for a longer period of time. This increased diversity in available items provides customers of the retailer with increased options for items to purchase or to include in an order, increasing a likelihood of customers placing subsequent orders for fulfillment with the retailer and increasing a number of items customers obtain from the retailer over time.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

receiving an order from a customer at the computer system, the order identifying one or more items and a retailer from which the one or more items are to be obtained;

identifying an unavailable item in the order;

obtaining a set of candidate replacement items for the unavailable item; generating, replacement score for each candidate replacement item of the set of candidate replacement items by applying a replacement model to each candidate replacement item, wherein the replacement model is trained to output a predicted probability of the customer performing a positive action in response to the unavailable item being replaced with the candidate replacement item, the replacement model trained by:

obtaining a replacement training dataset including a plurality of replacement training examples, each replacement training example including a combination of an item and a replacement item, each training example having a label indicating whether one or more customers previously performed the positive action in response to replacing the item with the replacement item;

applying the replacement model to each replacement training example of the replacement training dataset to generate a predicted probability of the customer performing the positive action in response to replacing the item with the replacement item;

scoring the replacement model using a loss function and the label of the training example; and updating one or more parameters of the replacement model by backpropagation based on the scoring; generating a predicted availability for each candidate replacement item of the set of candidate replacement items by applying an availability model applied to each candidate replacement item, wherein the availability model is trained to output a predicted probability of the candidate replacement item being available during a future time period;

generating a adjusting the replacement score for each candidate replacement item based on a combination of the predicted probability of the customer performing a positive action and the predicted availability of the candidate replacement item;

wherein the adjusting reduces the replacement score based on a likelihood of the candidate replacement item being unavailable during the future time period;

selecting one or more candidate replacement items based on the adjusted replacement scores; and displaying the selected one or more candidate replacement items to a user of the computer system associated with the order.

2. The method of claim 1, wherein combining the predicted probability of the customer performing a positive action and the predicted availability of the candidate replacement item adjusting the replacement score for each candidate replacement item of the set of candidate replacement items comprises:

generating adjusting the replacement score for the candidate replacement item as a product of the predicted availability of the candidate replacement item at the retailer and the predicted probability of the customer performing the positive action in response to the unavailable item being replaced with the candidate replacement item.

3. The method of claim 1, wherein combining the predicted probability of the customer performing a positive action and the predicted availability of the candidate replacement item adjusting the replacement score for each candidate replacement item of the set of candidate replacement items comprises:

applying a weight to the predicted probability of the customer performing the positive action in response to the unavailable item being replaced with the candidate replacement item;

applying an availability weight to the predicted availability of the candidate replacement item at the retailer; and generating the replacement score for the candidate replacement item as a sum of the predicted probability of the customer performing the positive action in response to the unavailable item being replaced with the candidate replacement item with the weight applied and the predicted availability of the candidate replacement item at the retailer with the availability weight applied.

4. The method of claim 1, wherein combining the predicted probability of the customer performing a positive action and the predicted availability of the candidate replacement item adjusting the replacement score for each candidate replacement item of the set of candidate replacement items comprises:

generating a predicted availability for each candidate replacement item of the set of candidate replacement items by applying an availability model applied to each candidate replacement item, for each of a plurality of future time periods; and selecting, as the predicted availability for each candidate replacement item, a predicted availability from the predicted availabilities for the plurality of future time periods.

5. The method of claim 4, wherein selecting the predicted availability from the predicted availabilities for the plurality of future time periods comprises selecting a lowest predicted availability from the predicted availabilities for the plurality of future time periods.

6. The method of claim 4, wherein the set of time periods includes multiple time periods within a time interval included in the order.

7. The method of claim 6, wherein the time interval comprises a length of time between consecutive times when the candidate replacement item has a maximum rate of being found by pickers at the retailer.

8. The method of claim 1, wherein displaying the selected one or more candidate replacement items to a user of the computer system associated with the order comprises:

transmitting instructions to a customer client device of the customer from whom the order was received to display an interface including the selected one or more candidate replacement items.

9. The method of claim 1, wherein displaying the selected one or more candidate replacement items to a user of the computer system associated with the order comprises:

transmitting instructions to a picker client device of a picker fulfilling the order to display an interface including the selected one or more candidate replacement items.

10. The method of claim 1, wherein the positive action comprises approval of the replacement of the unavailable item with the candidate replacement item.

11. A computer program product comprising a non-transitory computer readable storage medium having instructions encoded thereon that, when executed by a processor, cause the processor to perform steps comprising: receiving an order from a customer at a computer system, the order identifying one or more items and a retailer from which the one or more items are to be obtained;

identifying an unavailable item in the order; obtaining a set of candidate replacement items for the unavailable item;

generating replacement score for each candidate replacement item of the set of candidate replacement items by applying a replacement model to each candidate replacement item, wherein the replacement model is trained to output a predicted probability of the customer performing a positive action in response to the unavailable item being replaced with the candidate replacement item, the replacement model trained by:

obtaining a replacement training dataset including a plurality of replacement training examples, each replacement training example including a combination of an item and a replacement item, each training example having a label indicating whether one or more customers previously performed the positive action in response to replacing the item with the replacement item;

applying the replacement model to each replacement training example of the replacement training dataset to generate a predicted probability of the customer performing the positive action in response to replacing the item with the replacement item;

scoring the replacement model using a loss function and the label of the training example; and updating one or more parameters of the replacement model by backpropagation based on the scoring; generating a predicted availability for each candidate replacement item of the set of candidate replacement items by applying an availability model applied to each candidate replacement item, wherein the availability model is trained to output a predicted probability of the candidate replacement item being available during a future time period;

generating a adjusting the replacement score for each candidate replacement item based on a combination of the predicted probability of the customer performing a positive action and the predicted availability of the candidate replacement item;

wherein the adjusting reduces the replacement score based on a likelihood of the candidate replacement item being unavailable during the future time period; selecting one or more candidate replacement items based on the adjusted replacement scores; and displaying the selected one or more candidate replacement items to a user of the computer system associated with the order.

12. The computer program product of claim 11, wherein combining the predicted probability of the customer performing a positive action and the predicted availability of the candidate replacement item adjusting the replacement score for each candidate replacement item of the set of candidate replacement items comprises:

generating adjusting the replacement score for the candidate replacement item as a product of the predicted availability of the candidate replacement item at the retailer and the predicted probability of the customer performing the positive action in response to the unavailable item being replaced with the candidate replacement item.

13. The computer program product of claim 11, wherein combining the predicted probability of the customer performing a positive action and the predicted availability of the candidate replacement item adjusting the replacement score for each candidate replacement item of the set of candidate replacement items comprises:

applying a weight to the predicted probability of the customer performing the positive action in response to the unavailable item being replaced with the candidate replacement item;

applying an availability weight to the predicted availability of the candidate replacement item at the retailer; and generating the replacement score for the candidate replacement item as a sum of the predicted probability of the customer performing the positive action in response to the unavailable item being replaced with the candidate replacement item with the weight applied and the predicted availability of the candidate replacement item at the retailer with the availability weight applied.

14. The computer program product of claim 11, wherein combining the predicted probability of the customer performing a positive action and the predicted availability of the candidate replacement item adjusting the replacement score for each candidate replacement item of the set of candidate replacement items comprises:

generating a predicted availability for each candidate replacement item of the set of candidate replacement items by applying an availability model applied to each candidate replacement item, for each of a plurality of future time periods; and selecting, as the predicted availability for each candidate replacement item, a predicted availability from the predicted availabilities for the plurality of future time periods.

15. The computer program product of claim 14, wherein selecting the predicted availability from the predicted availabilities for the plurality of future time periods comprises selecting a lowest predicted availability from the predicted availabilities for the plurality of future time periods.

16. The computer program product of claim 14, wherein the set of time periods includes multiple time periods within a time interval included in the order.

17. The computer program product of claim 16, wherein the time interval comprises a length of time between consecutive times when the candidate replacement item has a maximum rate of being found by pickers at the retailer.

18. The computer program product of claim 11, wherein displaying the selected one or more candidate replacement items to a user of the computer system associated with the order comprises:

transmitting instructions to a customer client device of the customer from whom the order was received to display an interface including the selected one or more candidate replacement items.

19. The computer program product of claim 11, wherein displaying the selected one or more candidate replacement items to a user of the computer system associated with the order comprises:

transmitting instructions to a picker client device of a picker fulfilling the order to display an interface including the selected one or more candidate replacement items.

20. A computer system comprising: a processor; and a non-transitory computer readable storage medium having instructions encoded thereon that, when executed by the processor, cause the processor to perform steps comprising:

receiving an order from a customer at the computer system, the order identifying one or more items and a retailer from which the one or more items are to be obtained;

identifying an unavailable item in the order;

obtaining a set of candidate replacement items for the unavailable item;

generating replacement score for each candidate replacement item of the set of candidate replacement items by applying a replacement model to each candidate replacement item, wherein the replacement model is trained to output a predicted probability of the customer performing a positive action in response to the unavailable item being replaced with the candidate replacement item, the replacement model trained by:

obtaining a replacement training dataset including a plurality of replacement training examples, each replacement training example including a combination of an item and a replacement item, each training example having a label indicating whether one or more customers previously performed the positive action in response to replacing the item with the replacement item;

applying the replacement s-model to each replacement training example of the replacement training dataset to generate a predicted probability of the customer performing the positive action in response to replacing the item with the replacement item;

scoring the replacement model using a loss function and the label of the training example; and updating one or more parameters of the replacement model by backpropagation based on the scoring; generating a predicted availability for each candidate replacement item of the set of candidate replacement items by applying an availability model applied to each candidate replacement item, wherein the availability model is trained to output a predicted probability of the candidate replacement item being available during a future time period;

generating a adjusting the replacement score for each candidate replacement item based on a combination of the predicted probability of the customer performing a positive action and the predicted availability of the candidate replacement item, wherein the adjusting reduces the replacement score based on a likelihood of the candidate replacement item being unavailable during the future time period;

selecting one or more candidate replacement items based on the adjusted replacement scores; and displaying the selected one or more candidate replacement items to a user of the computer system associated with the order.

\* \* \* \* \*